(12) United States Patent  (10) Patent No.: US 6,708,661 B1
Aubourg et al.  (45) Date of Patent: Mar. 23, 2004

(54) CONTROL METHOD FOR STARTING A DIRECT INJECTION INTERNAL COMBUSTION ENGINE

(75) Inventors: Alain Aubourg, Saint Jean (FR); Bertrand Hauet, St Germain de la Grange (FR); Francis Tarroux, Pinsaguel (FR)

(73) Assignees: Siemens VDO Automotive SAS, Toulouse (FR); Renault SA, Boulogne Billancourt (FR)

( * ) Notice: Subject to any disclaimer, the term of this patent is extended or adjusted under 35 U.S.C. 154(b) by 0 days.

(21) Appl. No.: 10/129,814

(22) PCT Filed: Nov. 8, 2000

(86) PCT No.: PCT/EP00/11043

§ 371 (c)(1), (2), (4) Date: Sep. 17, 2002

(87) PCT Pub. No.: WO01/34961

PCT Pub. Date: May 17, 2001

(30) Foreign Application Priority Data

Nov. 10, 1999 (FR) .............................. 99 14146

(51) Int. Cl.$^7$ ........................... F02M 37/04; F02B 5/00; F02N 17/00; F02D 41/06
(52) U.S. Cl. .............................. 123/179.16; 123/179.3; 123/453; 123/305
(58) Field of Search ...................... 123/179.16, 179.17, 123/453, 456, 305, 179.3

(56) References Cited

U.S. PATENT DOCUMENTS

| | | | | |
|---|---|---|---|---|
| 5,558,068 A | * | 9/1996 | Kunishima et al. | 123/179.17 |
| 5,598,817 A | * | 2/1997 | Igarashi et al. | 123/179.17 |
| 5,794,586 A | * | 8/1998 | Oda et al. | 123/305 |
| 5,809,973 A | | 9/1998 | Iida et al. | |
| 5,918,578 A | * | 7/1999 | Oda | 123/456 |
| 5,979,400 A | * | 11/1999 | Nishide | 123/305 |
| 6,021,763 A | * | 2/2000 | Yoshihara et al. | 123/179.17 |

FOREIGN PATENT DOCUMENTS

| | | |
|---|---|---|
| DE | 40 20 298 | 1/1991 |
| DE | 195 39 885 | 11/1996 |
| EP | 0 849 455 | 5/1998 |
| EP | 0 919 710 | 6/1999 |
| GB | 2 315 297 | 1/1998 |

* cited by examiner

Primary Examiner—Henry C. Yuen
Assistant Examiner—Arnold Castro
(74) Attorney, Agent, or Firm—Young & Thompson

(57) ABSTRACT

During the starting, a) the temperature (T) of the engine and the pressure (P) of the fuel delivered by said pressurizing means are monitored, b) if T is below a predetermined threshold temperature ($T_s$), an engine starting mode is established in which the engine is started with fuel at high pressure as soon as the pressure (P) becomes higher than a predetermined threshold pressure ($P_{s1}$), and c) an engine starting mode is established where the engine is started using fuel at low pressure if $T > T_s$.

4 Claims, 1 Drawing Sheet

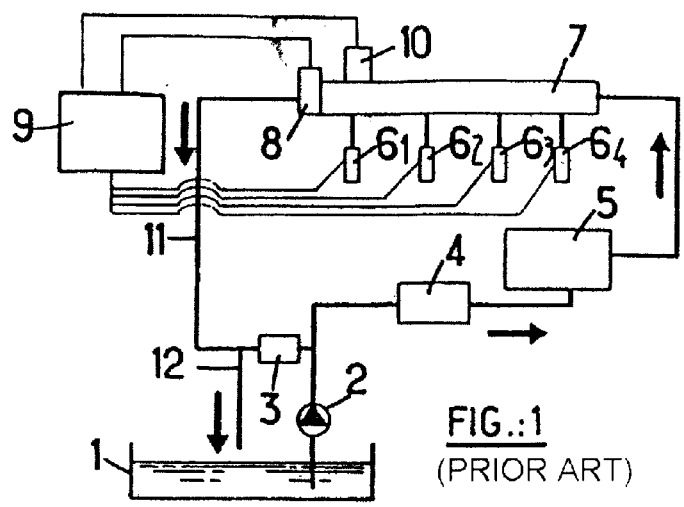
FIG.:1
(PRIOR ART)
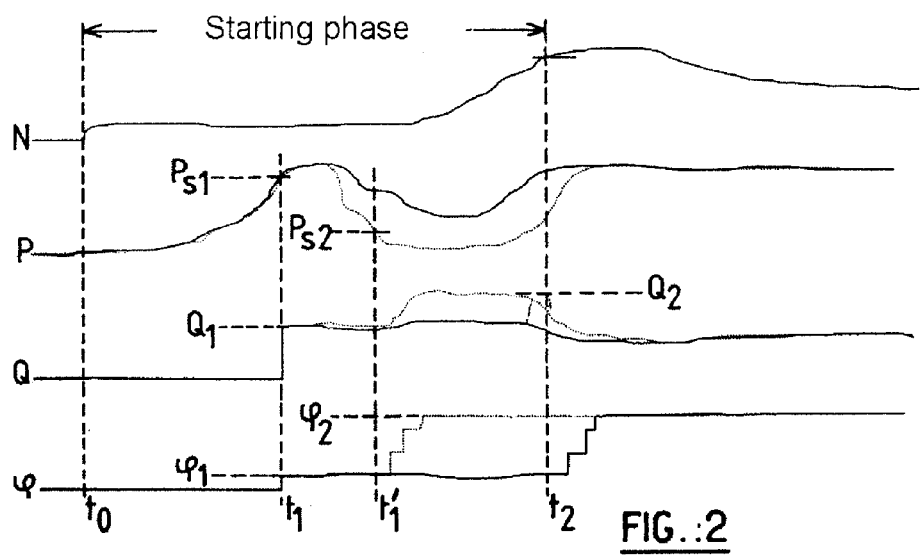
FIG.:2
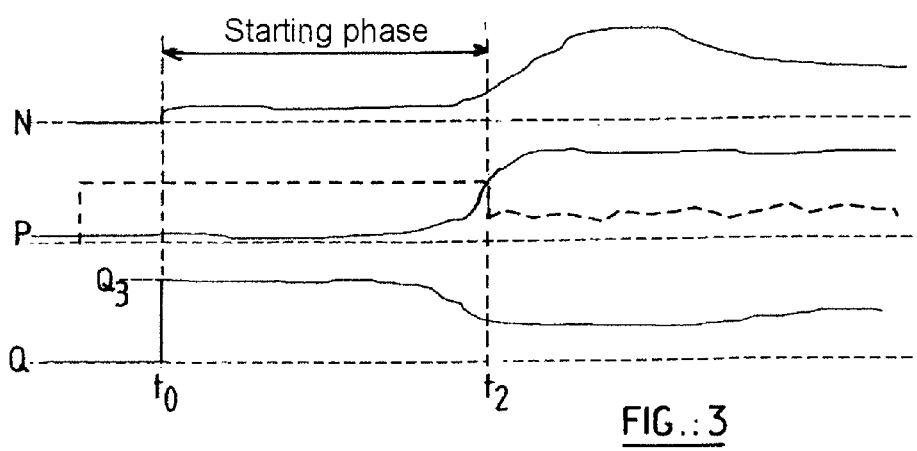
FIG.:3

CONTROL METHOD FOR STARTING A DIRECT INJECTION INTERNAL COMBUSTION ENGINE

The present invention relates to a method of controlling the starting of a direct-injection internal combustion engine in which a supply fuel is delivered to said engine by means of pressurizing said fuel.

FIG. 1 of the appended drawing depicts a device for supplying a direct-injection internal combustion engine with fuel, the device being of a known type comprising a tank 1 of fuel, an electric pump 2 supplied by the tank 1 and associated with a pressure regulator 3 for delivering fuel to a second pump, through a filter 4, the fuel delivered by the pump 2 being raised to a first pressure level higher than atmospheric pressure, but still relatively low, hence the name "low-pressure pump" given to the pump 2. The second pump 5, driven mechanically by the engine, raises the pressure of the fuel still further, to a second level, higher than the first, suitable for supplying fuel injectors $6_1$, $6_2$, $6_3$, $6_4$ mounted on an injection line 7 for supplying fuel to the cylinders of the direct-injection internal combustion engine (not depicted).

The pressure of the fuel delivered by the pump 5, known as the "high-pressure pump", is fixed by an electromechanical regulator 8, such as an electrically operated valve controlled by a computer 9. In this last case, a sensor 10 delivers to the computer 9 a signal representative of the pressure P of the fuel contained in the line 7, so as to allow the computer to regulate the pressure of the fuel in this line to the required predetermined level which is of the order of 50 to 100 bar. The computer 9 commonly consists of the engine management computer, which, amongst other things, controls the injectors $6_i$ (i ranging from 1 to 4 in the example depicted) and, in particular, the times for which they are open.

The fuel not delivered by the injectors $6_i$ is returned to the tank by a pipe 11, 12 at atmospheric pressure.

According to a known method of starting a direct-injection internal combustion engine supplied by the device depicted in FIG. 1, this starting is performed with fuel delivered to the injectors $6_i$ of the engine at a relatively low pressure (4 to 5 bar) achieved rapidly by the low-pressure pump which, being electrically operated, can be powered as soon as the vehicle (ignition) is switched on, before the engine is turned over.

In the case of a direct-injection internal combustion engine, however, starting at low fuel pressure entails resorting to an air/fuel mixture of a richness very much higher than that of a stoichiometric mixture, of the order of 10 times higher, the composition of this mixture at the spark plugs conventionally arranged in the cylinders of the engine to ignite it not being optimal in an engine of this type which is designed to be supplied in the normal way with fuel at high pressure, higher than 50 bar. This results in excessively long engine starting times, particularly in environments at low or very low temperature, and in a significant quantity of unburned hydrocarbons in the engine exhaust gases while the engine is starting.

The object of the present invention is precisely to provide a method of controlling the starting of a direct-injection internal combustion engine which does not have these disadvantages and which, in particular, makes it possible to shorten the engine starting time at low and very low temperatures, while at the same time then reducing the production of unburned hydrocarbons.

This object of the invention, together with others which will become apparent from reading the description which will follow, is achieved using a method of controlling the starting of a direct-injection internal combustion engine in which a supply fuel is delivered to said engine by means of pressurizing said fuel, this method being notable in that, during said starting, a) the temperature T of the engine and the pressure P of the fuel delivered by said pressurizing means are monitored, b) if T is below a predetermined threshold temperature $T_s$, an engine starting mode is established in which the engine is started with fuel at high pressure as soon as the pressure P becomes higher than a predetermined threshold pressure $P_{s1}$ and c) an engine starting mode is established where the engine is started using fuel at low pressure if $T > T_s$.

As will be seen later on, by normally starting the engine in this way, using fuel at high pressure rather than, as is conventional, at low pressure, the above-mentioned objectives are achieved.

According to another feature of the method according to the invention, in the starting mode using high-pressure fuel, if the fuel pressure remains higher than a predetermined threshold $P_{s2}$ which is lower than the threshold $P_{s1}$, a quantity of fuel to be injected into each cylinder of the engine is calculated and from this are deduced the length of time for which the injector considered is open and the time at which the injector opens, so as to allow said injection to close, in phase with an angular position of the engine crankshaft which is advanced by a predetermined angle with respect to the time that the air/fuel mixture is ignited.

Other features and advantages of the present invention will become apparent from reading the description which will follow and from examining the appended drawing in which:

FIG. 1 is a diagram of a fuel supply device for a direct-injection internal combustion engine described in the preamble of this description, and FIGS. 2 and 3 are sets of graphs illustrating modes for starting this engine using, for the fuel supplied to the engine, high-pressure fuel and low-pressure fuel, respectively.

FIG. 2 of the appended drawing contains graphs illustrating, in the engine starting phase, a change in engine speed N and in the pressure P of the fuel delivered to the engine, in the quantity Q of fuel injected and in the phasing φ of the end of injection of the fuel, in the situation in which the engine is started with the fuel at high pressure according to the present invention.

The engine management computer 9 is tasked with executing the engine startup strategy according to the present invention. In the conventional way, it receives various signals needed for engine management and, in particular, the signal P delivered by the fuel pressure sensor 10 (see FIG. 1), a signal N representing the engine speed and a signal T representing the engine temperature, normally delivered by a sensor (not depicted) that senses the temperature of the cooling water used to cool this engine. The computer 9 also determines the times at which the injectors $6_i$ open and close so as to regulate the quantities of the fuel injected into the cylinders of the engine and thus the phasing of these injections of fuel and particularly the phasing φ of the end of injection.

The computer 9 is duly programmed to execute the engine starting strategy according to the present invention, that will now be described in conjunction with the successive graphs in FIGS. 2 and 3.

As depicted in FIG. 2, when the engine is started up at the time $t_0$, something which is conventionally performed by an electric starter motor, the engine speed N rises to a non-zero value and the pressure P of the fuel begins to increase.

According to one important feature of the present invention, if, then, the temperature T of the engine is below a predetermined threshold temperature, for example $T_s=40°$ C., which signifies that the engine is doing a "cold start", the computer 9 executes a strategy for starting the engine in a mode known as the "high" fuel pressure mode.

According to this strategy, as soon as, at the time $t_1$, the fuel pressure P crosses a predetermined threshold $P_{s1}$ such that $P_{s1}=30$ bar for example, guaranteeing good atomization of this fuel in the injectors $6_i$, injection of fuel into the engine begins, the quantity injected being fixed at a level $Q_1$ corresponding to a relatively low richness of the air/fuel mixture (of the order of five times the stoichiometric richness at T=20°, namely half the richness needed at low pressure) as is suitable for supplying a direct-injection internal combustion engine with fuel at high pressure (normally 50 bar or higher).

The computer 9 continues to monitor the changes in fuel pressure P after the time $t_0$. The strategy applied from the time $t_1$ onward remains unchanged even if this pressure drops again, as depicted in solid line, below the threshold value $P_{s1}$, as long as it does not drop below another predetermined threshold $P_{s2}$ (in the part of the graph shown in dotted line), fixed at 10 bar for example.

If the threshold $P_{s2}$ is crossed, the computer abandons the high fuel-pressure start strategy described hereinabove, it not being possible for the pressurizing means used to achieve the high pressure needed during the starting phase considered. Such a situation may stem, for example, from a difficulty in priming the high-pressure pump or from a quantity of gasoline to be injected that exceeds the delivery of the high-pressure pump.

The computer 9 then reverts to a strategy of starting with low fuel pressure, which entails enriching the air/fuel mixture and therefore increasing the quantity Q of fuel injected, from $Q_1$ to $Q_2$ (see the part of the graph in dotted line).

The strategy described hereinabove is specific to the engine starting phase which has a duration $(t_2-t_0)$. After the time $t_2$, the quantities of fuel injected and the phasing of the injection of these quantities are regulated and controlled sequentially by conventional "maps" the input parameters of which are, for example, the engine air intake pressure and the engine speed.

During the starting phase $(t_0, t_2)$, the phasing of the injections of fuel is determined as follows. The computer determines the quantity of gasoline $Q_1$ to be injected and a time $t_i$ for which the corresponding injector will be open. The computer then determines the opening and closing times of the injector so that the injection phase ends before the spark plug that ignites the air/fuel mixture is energized.

It is known that the moment of this ignition is conventionally identified, in an engine cycle corresponding to a rotation through 720° of the crankshaft associated with the engine (in the case of a four-cylinder engine) by the ignition advance angle α, measured with respect to the piston passing through top dead center at the end of the compression stroke in the corresponding cylinder. In this angular frame of reference, the start-of-injection time $t_1$ is determined as a function of the length of time $T_i$ for which the injector is open so that the closure time of this injector occurs when the crankshaft reaches a position that is an angle α+φ in advance of top dead center.

Since, in a direct-injection internal combustion engine, injection takes place during the intake and possibly compression strokes during which the air/fuel mixture is taken into and compressed in the cylinder considered, injection is cut, this being when starting with a high fuel pressure according to the invention, in the mixture compression phase ($\phi=\phi_1$), the inlet valves of the cylinder then being closed, and this is done for as long as the fuel pressure remains high enough to be injected into the cylinder given the increasing pressure therein, namely for as long as the pressure of the fuel to be injected remains higher than 10 bar for example.

Below this pressure, the system according to the invention reverts to a mode of operation suited to fuel delivered at low pressure, as illustrated in broken line in the graphs of FIG. 2, from the time $t'_1$. The injection of fuel then stops earlier ($\phi=\phi_2$) during the air/fuel mixture intake stroke, as this mixture then remains more or less at atmospheric pressure, since the valves are open.

As depicted in FIG. 2, the switch from phase $\phi_1$ to phase $\phi_2$ occurs through intermediate levels implemented regularly as the engine crankshaft turns through successive steps of, for example, 50°, and this is to avoid amplifying the drop in fuel pressure.

Starting a direct-injection internal combustion engine at high fuel pressure makes it possible to ensure good quality combustion by virtue of the composition of the air/fuel mixture near the spark plug that can be obtained with a fuel at high pressure. These good combustions make it possible to shorten the engine start time at low and very low temperatures to, for example, below 1 to 2 seconds. They also make it possible to reduce the quantity of unburned hydrocarbons carried by the exhaust gases and therefore the extent to which these gases pollute the environment.

The applicant company has observed that, during a cold start, the high-pressure pump 5 is able, right from the first few engine revolutions, to supply a high enough fuel pressure to suitably atomize the fuel in the engine cylinders, affording the aforementioned advantages.

By contrast, during a hot start ($T>T_s$), the requirements in the specifications are far more strict on starting time, generally requiring this to take place in under half a second. In this case, the first revolutions required to supply a suitable high-pressure fuel exceed the authorized length of time. In addition, the risk of generating a fuel vapor at the inlet of the high-pressure pump is likely to delay starting still further.

The solution conventionally employed in indirect injection, which consists in injecting a predetermined quantity of fuel simultaneously upstream of each cylinder proves ill suited to the case of a direct injection engine; as fuel is injected directly into the cylinder, without benefiting from the barrier of the inlet valves to perform suitable distribution, the cylinders in the power or exhaust phase dump this fuel into the exhaust, thus generating pollution through unburned hydrocarbons.

According to the invention, a strategy for starting at low pressure is chosen in which, as soon as the vehicle (ignition) is switched on, the electromechanical regulator 8 (FIG. 1) and the low-pressure pump 2 are operated in such a way as to establish, in the fuel circuit, a circulation of fuel at the maximum pressure allowed by the pump 2 and the pressure regulator 3. Advantageously, in an alternative form of the supply device of FIG. 1, in which the fuel return line 11 from the injection line set is connected upstream of the regulator 3, all that is required is for the electromechanical regulator 8 to be set to wide open. This command is represented via the broken line on the graph P in FIG. 3.

At the same time, and as soon as the engine starts to turn over, at the time to, the computer 9 determines a quantity $Q_3$ of fuel to be injected and the corresponding length of time $T_i$ for which the injectors will be open. At the same time, the signals identifying the angular position of the engine, that is to say, in the conventional way, the signal from a sensor identifying a unique feature of a target connected to the crankshaft and that of a sensor giving the position of the camshaft are observed. As soon as a feature on either one of these signals is observed, it is possible to estimate which will be the next cylinder to enter the inlet phase, and the time at which the corresponding inlet valve will open. This is because there is, by construction, a mechanical relationship between the crankshaft and/or the camshaft and the valves. Injection into that cylinder is then commanded from the opening of the valve and for the time $T_i$. The fuel is injected sequentially with the inlet valve open, into the following cylinders, with a programmable angular phase shift (corresponding to the number of engine cylinders) with respect to the feature considered, for at least one engine cycle. This method makes it possible, by observing the first occurrence of the "camshaft" or "crankshaft" signal, to perform a first injection with a mean advance of half an engine revolution (for a four-cylinder engine) with respect to the conventional methods of synchronization and therefore to save about half a second on the duration of the starting phase.

Such hot starting at low fuel pressure is also quicker than a high-pressure hot start because it allows any fuel vapors present in the high-pressure pump to be purged out, which vapors would otherwise disrupt the operation of this pump.

The injection time $T_i$ is a function of various conventional parameters: the engine speed N, the inlet air pressure, the cooling water temperature, the fuel pressure and, according to the present invention, the starting mode chosen: high pressure or low pressure, the quantity of fuel to be injected advantageously being lower in a high-pressure start.

According to the invention, the starting phase is left, at the time $t_2$ (see FIGS. 2 and 3) through a procedure common to a high-pressure start or low-pressure start. This phase is thus left when the speed N crosses a threshold or after a predetermined length of time.

Having left the starting phase, the computer 9 uses conventional maps to determine the quantity of fuel to be injected and the times at which the injectors should open and close, these maps having, as input, for example, the pressure of the air let into the engine and the engine speed N. The transition toward this mapped quantity of fuel Q takes place by incrementally decreasing the quantity calculated for the starting phase.

What is claimed is:

1. A method of controlling the starting of a direct-injection internal combustion engine in which a supply fuel is delivered to said engine by means (2, 5) of pressurizing said fuel, in which method, during said starting, a) the temperature (T) of the engine and the pressure (P) of the fuel delivered by said pressurizing means are monitored, b) if T is below a predetermined threshold temperature ($T_s$), an engine starting mode is established in which the engine is started with fuel at high pressure as soon as the pressure (P) becomes higher than a predetermined threshold pressure ($P_{s1}$), and c) an engine starting mode is established where the engine is started using fuel at low pressure if $T>T_s$, characterized in that, in the starting mode using high-pressure fuel, if the fuel pressure remains higher than a predetermined threshold ($P_{s2}$) which is lower than the threshold ($P_{s1}$), a quantity ($Q_1$) of fuel to be injected into each cylinder of the engine is calculated and from this are deduced the length of time ($T_i$) for which the injector considered is open and the time at which the injector ($6_i$) opens, so as to allow said injector ($6_i$) to close, with the valves closed, in phase with an angular position of the engine crankshaft which is advanced by a predetermined angle ($\phi_1$) with respect to the time that the air/fuel mixture is ignited.

2. The method claimed in claim 1, characterized in that, in the starting mode using high-pressure fuel, if the pressure (P) of the fuel drops back below a predetermined threshold ($P_{s2}$) but is lower than the threshold ($P_{s1}$), then the method reverts to starting the engine with low-pressure fuel.

3. The method claimed in claim 2, characterized in that, on returning to starting the engine with low-pressure fuel, a quantity ($Q_2$) of fuel to be injected at low pressure is calculated, said quantity is injected in turn into the cylinders of the engine, the length ($T_i$) of said injection and the start of opening of each injector being chosen so that the injector closes with the valves open, in phase with an angular position of the engine crankshaft which is advanced by a predetermined angle ($\phi_2$) with respect to the time at which the air/fuel mixture is ignited.

4. The method claimed in claim 1, characterized in that, in step c), sequential injection of fuel into the engine cylinders which is phased with the opening of the inlet valve of the first cylinder is commanded.

* * * * *